United States Patent
Bickham et al.

(10) Patent No.: US 9,519,101 B2
(45) Date of Patent: Dec. 13, 2016

(54) FEW MODED OPTICAL FIBER AND SYSTEM INCORPORATING SUCH

(71) Applicant: Corning Incorporated, Corning, NY (US)

(72) Inventors: Scott Robertson Bickham, Corning, NY (US); Dana Craig Bookbinder, Corning, NY (US); Ming Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/689,538

(22) Filed: Apr. 17, 2015

(65) Prior Publication Data

US 2015/0309250 A1    Oct. 29, 2015

Related U.S. Application Data

(60) Provisional application No. 61/985,740, filed on Apr. 29, 2014.

(51) Int. Cl.
*G02B 6/028* (2006.01)
*G02B 6/42* (2006.01)
*G02B 6/02* (2006.01)

(52) U.S. Cl.
CPC ......... *G02B 6/0288* (2013.01); *G02B 6/02395* (2013.01); *G02B 6/42* (2013.01)

(58) Field of Classification Search
CPC .................................. G02B 6/028; G02B 6/02
USPC ........................................................ 385/124
See application file for complete search history.

(56) References Cited

U.S. PATENT DOCUMENTS

| | | | |
|---|---|---|---|
| 7,783,149 B2* | 8/2010 | Fini | 385/123 |
| 7,787,731 B2 | 8/2010 | Bookbinder | |
| 8,842,957 B2* | 9/2014 | Bickham et al. | 385/124 |
| 2008/0267560 A1* | 10/2008 | DiGiovanni et al. | 385/28 |
| 2009/0169163 A1 | 7/2009 | Abbott | |
| 2011/0064367 A1* | 3/2011 | Molin et al. | 385/100 |
| 2013/0039626 A1 | 2/2013 | Bickham et al. | |
| 2013/0039627 A1* | 2/2013 | Li et al. | 385/126 |

(Continued)

OTHER PUBLICATIONS

"Opportunities to Enhance Multimode Fiber Links by Application of Overfilled Launch," D. Donlagic, J. Lightwave Technol. (2005). This article discloses some MMF designs with smaller core diameters and high bandwidth at 850 nm, but the microbend sensitivities are 1.73, 2.23 and 2.78, respectively.

(Continued)

*Primary Examiner* — Kaveh C Kianni
(74) *Attorney, Agent, or Firm* — Svetlana Z. Short (57) ABSTRACT

One embodiment of the disclosure relates to a few moded optical fiber comprises: a glass graded index core having alpha profile such that $2.0 \leq \alpha \leq 2.15$, a diameter D1 in the range of 13 microns to 40 microns, a maximum relative refractive index between 0.265 and 0.65 percent, core being structured to propagate more with X number of mode groups at a wavelength of 850 nm, wherein X is an integer greater than 1 and less than 8; and (b) a cladding including a depressed-index annular region surrounding the inner cladding. The fiber has an overfilled bandwidth greater than 2.0 GHz-km at 850 nm and relative microbending sensitivity $\gamma$ such that $\gamma \leq 1.5$.

9 Claims, 3 Drawing Sheets (56) References Cited

U.S. PATENT DOCUMENTS

| | | | |
|---|---|---|---|
| 2013/0136407 A1* | 5/2013 | Berkey et al. | 385/124 |
| 2013/0251324 A1* | 9/2013 | Fini et al. | 385/124 |
| 2014/0064686 A1* | 3/2014 | Lars et al. | 385/124 |
| 2014/0093205 A1* | 4/2014 | Gruner-Nielsen et al. | 385/43 |
| 2015/0168643 A1* | 6/2015 | Gruner-Nielsen et al. | 385/28 |
| 2015/0293300 A1* | 10/2015 | Fini et al. | 385/28 |

OTHER PUBLICATIONS

T.A.Lenahan, "Calculation of Modes in an Optical Fiber Using the Finite Element Method and EISPACK," Bell Sys. Tech. J., vol. 62, pp. 2663-2695 (1983).

Olshansky, R. "Distortion Losses in Cabled Optical Fibers." Appl. Opt., 14, 20 (1975).

\* cited by examiner

FEW MODED OPTICAL FIBER AND SYSTEM INCORPORATING SUCH

RELATED APPLICATIONS

This application claims the benefit of U.S. Provisional Application No. 61/985,740, filed on Apr. 29, 2014, The entire teachings of the above applications are incorporated herein by reference.

BACKGROUND

The disclosure relates generally to optical fibers, and more specifically to few moded optical fibers which may be used with 850 nm VCSELs (Vertical Cavity Surface Emitting Lasers).

TECHNICAL BACKGROUND

Corning Incorporated manufactured and sold Infinicor® 50 micron optical fiber optical fiber, which is multi-moded optical fiber having a core with a maximum relative refractive index delta of about 1% and, a core diameter of 50 microns, and pure silica cladding.

No admission is made that any reference cited herein constitutes prior art. Applicant expressly reserves the right to challenge the accuracy and pertinence of any cited documents.

SUMMARY

One embodiment of the disclosure relates to a few moded optical fiber comprises:

a glass graded index core having alpha profile such that $2.0 \le \alpha \le 2.15$, a diameter $D_1$, such that 12.5 microns $\le D_1 < 40$ microns, a maximum relative refractive index delta between 0.265 and 0.65 percent, and the glass core diameter $D_1$ and refractive index are selected such that the core is capable of supporting the propagation and transmission of an optical signal with X number of mode groups at a wavelength of 850 nm, wherein X is an integer greater than 1 and less than 8; and a cladding including a depressed-index annular region surrounding the core. The cladding may include an optional inner cladding region surrounding the core, wherein the depressed-index annular region surrounds the inner cladding. In some exemplary embodiments 12.5 microns $\le D_1 < 38$ microns. In some exemplary embodiments 12.5 microns $\le D_1 < 36$ microns, and in some exemplary embodiments 12.5 microns $\le D_1 < 25$ microns. In some embodiments $2.05 \le \alpha \le 2.15$, in some embodiments $2.09 \le \alpha \le 2.13$, and in some embodiments $2.1 \le \alpha \le 2.11$. The depressed-index annular region of the cladding has a relative refractive index delta of less than −0.15% and a width of at least 1 micron. The fiber embodiments disclosed herein have relative micro bending sensitivity γ such that $\gamma \le 1.5$ and has an overfilled bandwidth greater than 4.0 GHz-km at a wavelength of 850 nm. In some exemplary embodiments $\gamma \le 1.0$. the fiber has an overfilled bandwidth greater than 4.0 GHz-km at 850 nm, and in some embodiments greater 6 GHz-km at 850 nm. In some embodiments the overfilled bandwidth is greater than 10.0 GHz-km or even greater than 20 GHz-km at 850 nm. According to some embodiments, the overfilled bandwidth is at least 30.0 GHz-km at 850 nm (e.g., 30 to 165 GHz-km at 850 nm). According to some embodiments the fiber core has a numerical aperture NA such that $0.10 \le NA \le 0.17$.

According to some embodiments, 15 microns $\le D_1 \le 38$ microns, and in some embodiments 15 microns $\le D_1 \le 36$ microns, and in some embodiments 16 microns $\le D_1 \le 32$ microns. In some embodiments the fiber core has a maximum relative refractive index delta between 0.3 and 0.6 percent, for example between 0.3 and 0.5 percent.

According to some embodiments, a few moded optical fiber comprises:

a glass graded index core having alpha profile such that $2 \le \alpha \le 2.15$, (e.g. $2.05 \le \alpha \le 2.13$, or $2.1 \le \alpha \le 2.11$), a diameter D1 in the range of 13 microns to 36.5 microns (e.g., 15 microns, 20 microns, 25 microns, 30 microns, 35 microns, 36 microns, or therebetween) a maximum relative refractive index delta $\Delta_1$ between 0.265 and 0.65 percent (for example between 0.3 and 0.61 percent, and in some embodiments less than 0.6%), the glass core diameter $D_1$ and refractive index are selected such that the core is structured to support propagation and transmission of an optical signal with X number of mode groups at a wavelength of 850 nm, wherein X is an integer greater than 1 and less than 8; and a cladding including an inner cladding and the depressed-index annular region surrounding the inner cladding. The depressed-index annular region has a relative refractive index delta of less than −0.15% and a width of at least 1 micron. The fiber has relative microbending sensitivity γ such that $\gamma \le 1.5$ and an overfilled bandwidth greater than 20.0 GHz-km at 850 nm and a numerical aperture NA of $0.10 \le NA \le 0.17$ (and in some embodiments of $0.11 \le NA \le 0.165$).

According to some embodiments, to a few moded optical fiber comprises:

a glass graded index core having alpha profile such that $2.05 \le \alpha \le 2.15$ (e.g., $2.1 \le \alpha \le 2.11$), a diameter D1 in the range of 13 microns to 36.5 microns (e.g., 15 microns, 20 microns, 25 microns, 30 microns, 35 microns, 36 microns, or therebetween) a maximum relative refractive index delta between 0.265 and 0.65 percent (for example between 0.3 and 0.61 percent, and in some embodiments less than 0.6%, e.g., between 0.3 and 0.6%); and a cladding including a depressed-index annular region in contact and directly surrounding the core. The depressed-index annular region has a relative refractive index delta of less than −0.15% and a width of at least 1 micron. The fiber has relative microbending sensitivity γ such that $\gamma \le 1.5$ and an overfilled bandwidth greater than 20.0 GHz-km at 850 nm and a numerical aperture NA of $0.10 \le NA \le 0.17$ (and in some embodiments of $0.11 \le NA \le 0.165$).

An additional embodiment of the disclosure relates to a system comprising:

(i) at least light source transmitting at a bit rate of 10 Gb/s or higher at one or more wavelengths between 840 and 860 nm (e.g., greater 25 Gb/s to 40 Gb/s) and (ii) at least one few moded optical fiber optically coupled to the light source, the fiber comprises a graded index glass core, and a cladding comprising an outer cladding region, the glass core diameter $D_1$ and refractive index are selected such that the core is capable of supporting the propagation and transmission of an optical signal with X number of mode groups at a wavelength of 850 nm, wherein X is an integer greater than 1 and less than 8; and wherein the fiber has an overfilled bandwidth at an operating wavelength situated in 840 nm to 860 nm wavelength range greater than 4 GHz-km; an alpha being $2.05 \le \alpha \le 2.15$ (e.g., $2.1 \le \alpha \le 2.11$); and an attenuation of not greater than 2.5 dB/km (e.g., less than 2 dB/km, or 1.75 to 1.85 dB/km) at 850 nm wavelength; and relative microbending sensitivity γ such that γ<1.5.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index" is defined as $\Delta=100\times[n(r)^2-n_{c1}^2]/2n(r)^2$, where $n(r)$ is the refractive index at the radial distance r from the fiber's centerline, unless otherwise specified, and $n_{c1}$ is the average refractive index of the outer cladding region of the cladding at a wavelength of 850 nm, which can be calculated, for example, by taking "N" index measurements ($n_{C1}$, $n_{C2}$, ... $n_{CN}$) in the outer annular region of the cladding, and calculating the average refractive index by: measurements ($n_{C1}$, $n_{C2}$, ... $n_{CN}$) in the outer annular region of the cladding, and calculating the average refractive index by:

$$n_C = (1/N)\sum_{i=1}^{i=N} n_{Ci}.$$

In some exemplary embodiments, the outer cladding region comprises essentially pure silica. As used herein, the relative refractive index is represented by delta or Δ and its values are typically given in units of "%," unless otherwise specified. In cases where the refractive index of a region is less than that of the average refractive index of the outer cladding region, the relative index percent is negative and is referred to as having a depressed index, and is calculated at the point at which the relative index is most negative unless otherwise specified. In cases where the refractive index of a region is greater than the refractive index of average refractive index of the outer cladding region, the relative index percent is positive and the region can be said to be raised or to have a positive index, and is calculated at the point at which the relative index is most positive, unless otherwise specified. With reference to core delta value, it is disclosed herein as maximum % delta.

An "up-dopant" is herein considered to be a dopant which has a propensity to raise the refractive index relative to pure undoped $SiO_2$. A "down-dopant" is herein considered to be a dopant which has a propensity to lower the refractive index relative to pure undoped $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dop ants may be present in a region of an optical fiber having a negative relative refractive index.

Unless otherwise stated, the overfill (or overfilled (OFL)) bandwidth (BW) of an optical fiber is defined herein as measured using overfilled launch conditions at 850 nm according to IEC 60793-1-41 (TIA-FOTP-204), Measurement Methods and Test Procedures: Bandwidth. In the discussion below, bandwidth BW is understood to mean overfilled bandwidth unless otherwise indicated.

The minimum calculated effective modal bandwidth (EBW) can be obtained from measured differential mode delay spectra as specified by IEC 60793-1-49 (TIA/EIA-455-220), Measurement Methods and Test Procedures: Differential Mode Delay.

The NA of an optical fiber means the numerical aperture as measured using the method set forth in IEC-60793-1-43 (TIA SP3-2839-URV2 FOTP-177) titled "Measurement Methods and Test Procedures: Numerical Aperture".

The modeled bandwidth may be calculated according to the procedure outlined in T. A. Lenahan, "Calculation of Modes in an Optical Fiber Using the Finite Element Method and EISPACK," Bell Sys. Tech. J., vol. 62, pp. 2663-2695 (1983), the entire disclosure of which is hereby incorporated herein by reference. Equation 47 of this reference is used to calculate the modal delays; however note that the term $dk_{clad}/d\omega^2$ must be replaced with $dk^2_{clad}/d\omega^2$, where $k_{clad}=2\pi*n_{clad}/\lambda$ and $\omega=2\pi/\lambda$, and $n_{clad}=nc$ where is the average index of refraction of the outer cladding region. The modal delays are typically normalized per unit length and given in units of ns/km (or equivalently in units of ps/m). The calculated bandwidths also assume that the refractive index profile is ideal, with no perturbations such as a centerline dip, and as a result, represent the maximum bandwidth for a given design.

The term graded index, "α-profile" or "alpha profile," as used herein, refers to a relative refractive index profile, expressed in terms of Δ which is in units of "%", where r is the radius and which follows the equation, $$\Delta(r) = \Delta_0 \left[1 - \left(\frac{r}{R_1}\right)^\alpha\right],$$

where $\Delta_0$ is the relative refractive index extrapolated to r=0, $R_1$ is the radius of the core (i.e. the radius at which Δ(r) is zero), and a is an exponent which is a real number. For a step index profile, the alpha value is greater than or equal to 10. For a graded index profile, the alpha value is less than 10. The term "parabolic," as used herein, includes substantially parabolically shaped refractive index profiles which may vary slightly from an α value of, for example, 2.0 at one or more points in the core, as well as profiles with minor variations and/or a centerline dip. The modeled refractive index profiles that exemplify the invention have graded index cores which are perfect alpha profiles. An actual fiber will typically have minor deviations from a perfect alpha profile, including features such as dips or spikes at the centerline and/or a diffusion tail at the outer interface of the core. However accurate values of alpha and $\Delta_0$ may still be obtained by numerically fitting the measured relative refractive index profile to an alpha profile over the radius range from $0.05\ R_1 \le r \le 0.95\ R_1$. In ideal graded index fibers with no imperfections such as dips or spikes at the centerline, $\Delta_0 = \Delta_{1MAX}$, where $\Delta_{1MAX}$ is the maximum refractive index of the core. In other cases, the value from $\Delta_0$ obtained from the numerical fit from $0.05\ R_1 \le r \le 0.95\ R_1$ may be greater or less than $\Delta_{1MAX}$.

The depressed-index annular region has a profile volume (absolute value), $V_3$, defined herein as:

$$2 \int_{R_{INNER}}^{R_{OUTER}} \Delta_3(r) r\, dr$$

where $R_{INNER}$ is the depressed-index annular region inner radius and $R_{OUTER}$ is the depressed-index annular region outer radius as defined. For the fibers disclosed herein, in some embodiments the absolute magnitude of $V_3$ is greater than 35%-micron$^2$, and in some embodiments greater than 40%-micron$^2$, for example, between 35%-micron$^2$ and 105%-micron$^2$ (also referred to herein as %-sq·μm).

The microbending loss is compared to that of conventional 50 μm multimode fiber (MMF), which has a core radius of 25 μm and a maximum relative refractive index of 1% with parabolic α profile of 2.1, and silica cladding without the depressed-index annular region. This conventional multimode fiber propagates about 18 mode groups at 850 nm. The relative microbending sensitivity of a multi mode or a few moded fiber can be calculated by $$\gamma_m = N \langle h^2 \rangle \frac{a^4}{b^6 \Delta^3} \left(\frac{E}{E_f}\right)^{3/2}$$

where $\gamma_m$ is microbending loss (relative microbending sensitivity) due to the microbending induced attenuation increase, N is the number of bumps of average height h per unit length, b is the total fiber diameter, a is the core radius, Δ is the fiber refractive index difference and $E_f$ and E are the elastic moduli of the fiber and the fiber surrounding material (i.e., coating) respectively [Olshansky, R. "Distortion Losses in Cabled Optical Fibers." Appl. Opt., 14, 20 (1975)]. In fibers with the same coating and glass diameter, the relative microbending sensitivity (relative to the standard 50 μm multimode fiber) of a fiber with core radius a (in microns) and maximum core delta $\Delta_{1max}$ (%) is then $$\gamma = \frac{(a/25)^4}{\Delta^3}$$

According to the embodiments described herein, the relative microbending sensitivity γ (also refreed microbend sensitivity herein, or microbending loss) is preferably less than 1.5, more preferably less than 1.1, more preferably less than 1, and still more preferably less than 0.75. For example, the microbending sensitivity may 0.6 or less, 0.5 or less, 0.4 or less, or 0.3 or less.

Reference will now be made in detail to the present preferred embodiments, examples of which are illustrated in the accompanying drawings. Whenever possible, the same reference numerals will be used throughout the drawings to refer to the same or like parts.

Various embodiments of a few moded optical fiber 10 optimized for a bandwidth with a center or peak wavelength at or about λ=850 nm (±10 nm) and exhibiting an enhanced performance characteristics are provided herein. The few moded optical fiber 10 has a graded index glass core 20 and a cladding 60 surrounding and in contact with the core. The core 20 of the exemplary fiber embodiments described herein has a diameter $D_1$ in the range of 13 microns (μm) to 40 microns or a radius $R_1$ in the range of 6.5 microns to 20 microns. The core also includes a graded index having an alpha (a) value between 2.05≤α≤2.15 (e.g., 2.09≤α≤2.13, or 2.1≤α≤2.11). The core further has a maximum refractive index in the range between 0.265 percent and 0.65 percent and preferably 0.3 to 0.61 percent. According to some embodiments, 12.5 microns ≤$D_1$≤38 microns, preferably 12.5 microns≤$D_1$≤36 microns (e.g., 13, 15, 18, 20 microns, 22 microns, 23 microns 24.5 microns, 25 microns, 30 microns, 35 microns, 36 microns, or therebetween), and in some embodiments 16 microns ≤$D_1$<32 microns or 12 microns ≤$D_1$<25 microns. In some embodiments the fiber core has a maximum relative refractive index delta between 0.275 and 0.61 percent, and in some embodiments between 0.3 and 0.6 percent. According to some embodiments, the fiber core has a numerical aperture NA, wherein 0.11≤NA≤0.17.

The cladding includes a depressed-index annular region. The depressed-index annular region has a relative refractive index delta of less than –0.15% (preferably less than –0.2%) and a width of at least 1 micron.

The fiber further has an overfilled bandwidth (OFL BW) greater than 4.0 GHz-km at 850 nm and relative microbending sensitivity γ such that γ≤1.5. preferably the fiber has an overfilled bandwidth greater than 10.0 GHz-km at 850 nm. In the embodiments disclosed herein the fiber has an overfilled bandwidth greater than 20 GHz-km at 850 nm. In some exemplary embodiments γ≤1.0. In some exemplary embodiments overfilled bandwidth greater than overfilled bandwidth greater than 30.0 GHz-km at 850 nm, and in some embodiments greater the overfilled bandwidth is greater than 40 GHz-km or even greater than 50 GHz-km at 850 nm. According to some embodiments, the overfilled bandwidth is at least 30.0 GHz-km at 850 nm. For example, the optical fiber embodiments shown in Tables 1-6 exhibit overfilled bandwidths between 30 GHz-km to 165 GHz-km at 850 nm.

Figure 1:
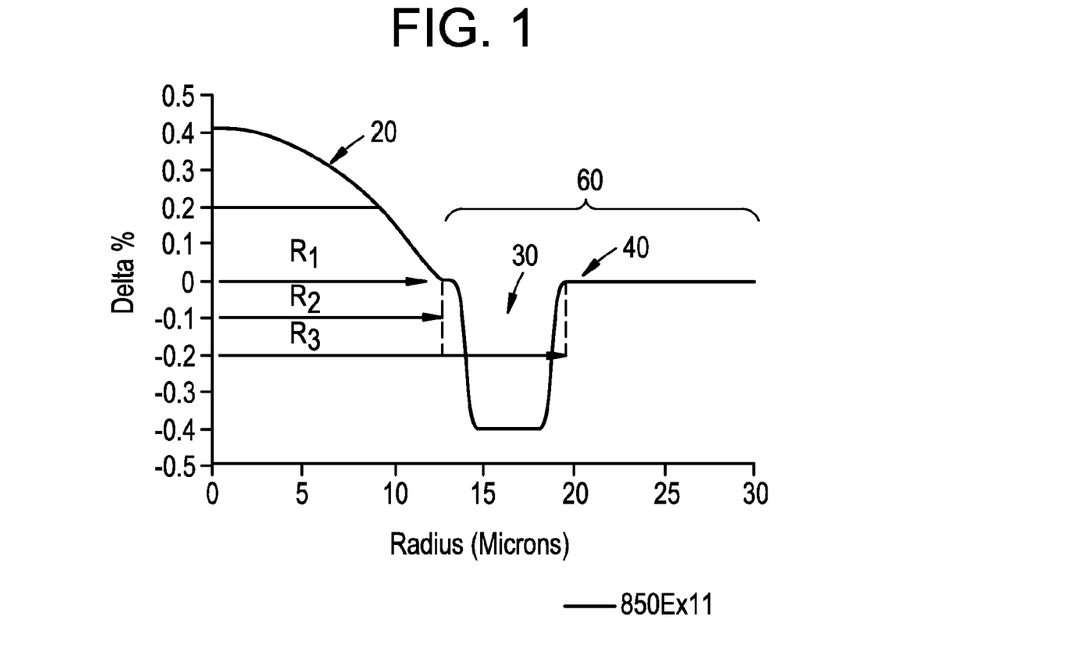
FIG. 1 shows a schematic representation (not to scale) of the refractive index profile of a cross-section of the glass region of another exemplary embodiment of few moded optical fiber.

Referring to FIG. 1, a schematic representation of the refractive index profile of the cross section of the glass region of a few moded optical fiber 10 is shown, according one embodiment. The few moded optical fiber 10 includes a glass core 20 and a glass cladding 60 that surrounds the core 20 and is in contact with the core 20. The core 20 may include silica doped with germania, according to one embodiment. According to other embodiments, dopants other than germania ($GeO_2$), such as $Al_2O_3$ or $P_2O_5$ singly or in combination, may be employed within the core 20, and particularly at or near the centerline of the optical fiber 10. The cladding 60 of the optical fiber 10 shown in FIG. 1 includes an inner annular region 30, a depressed-index annular region 40, and an outer annular region 50. According to some exemplary embodiments, the inner cladding region 30 may be pure silica. In other embodiments it may include one or more updopants (e.g., $GeO_2$, $Al_2O_3$, $P_2O_5$, $TiO_2$, $ZrO_2$, $Nb_2O_5$ and/or $Ta_2O_5$—which increase the index of refraction relative to pure silica) and one or more downdopants (e.g., F and/or B). In the embodiments of FIG. 1 the inner annular region 30 surrounds and is in contact with the core 20. In some embodiments the depressed-index annular region 40 surrounds and is in contact with the inner annular region 30. Preferably the width of the inner cladding 30 is at least 0.5 microns and less than 4 microns (e.g., 0.5 microns to 2 microns). The depressed-index annular region 40 includes one or more downdopants (e.g., F and/or B) which decrease the index of refraction relative to pure silica. The outer annular region 50 surrounds and is in contact with the depressed-index annular region 40. The cladding 60 may further include additional regions (not shown) such as further glass regions surrounding the outer annular region 50. The fiber 10 may further include a protective coating 70 (not shown) surrounding the cladding 60.

Figure 2:
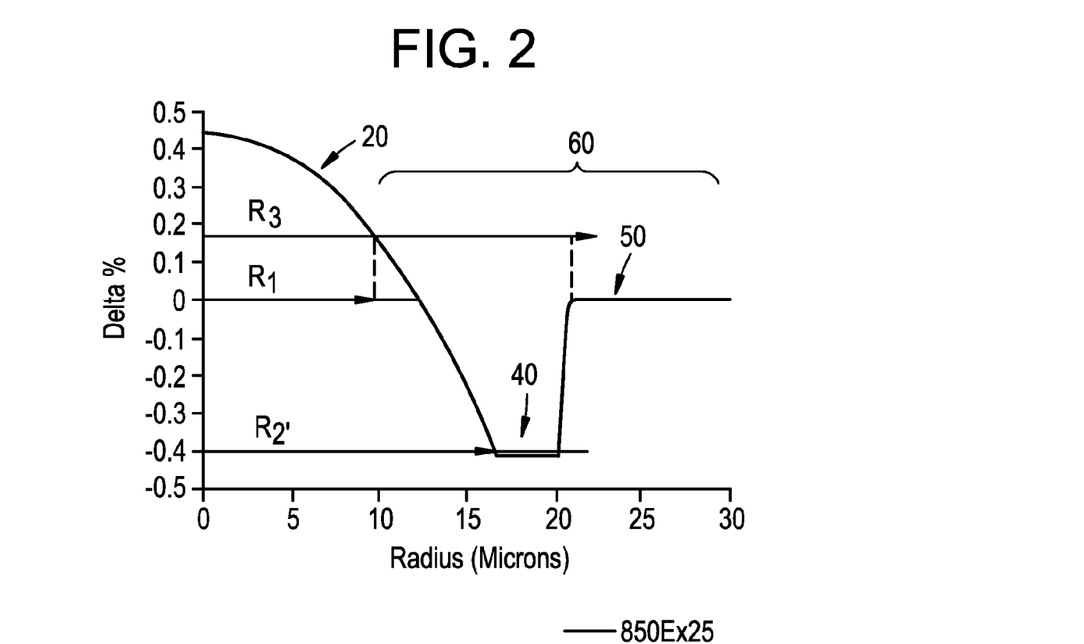
FIG. 2 shows a schematic representation (not to scale) of the refractive index profile of a cross-section of the glass region of another exemplary embodiment of few moded optical fiber.
Figure 3:
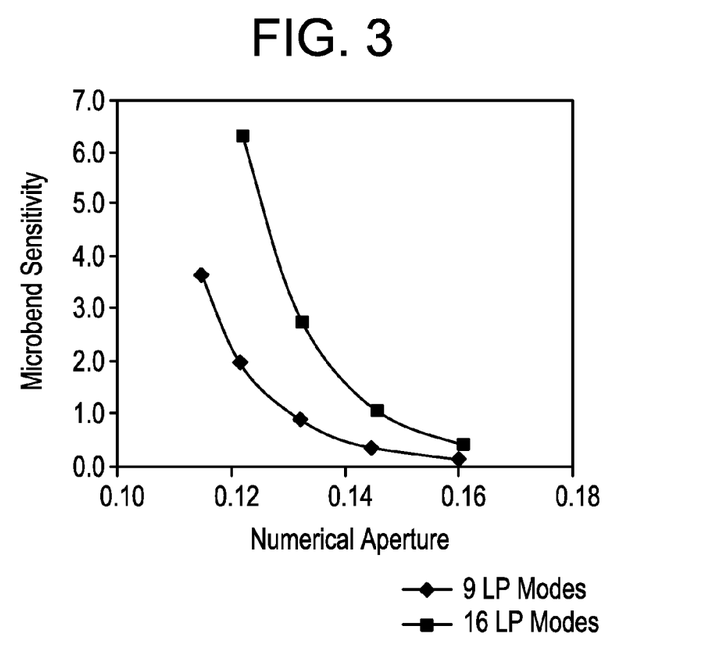
FIG. 3 illustrates micro bend sensitivity of several embodiments of few moded (FM) optical fiber with profiles similar to that shown in FIGS. 1 and 2, as a function of the fiber NA (numerical aperture)
Figure 4:
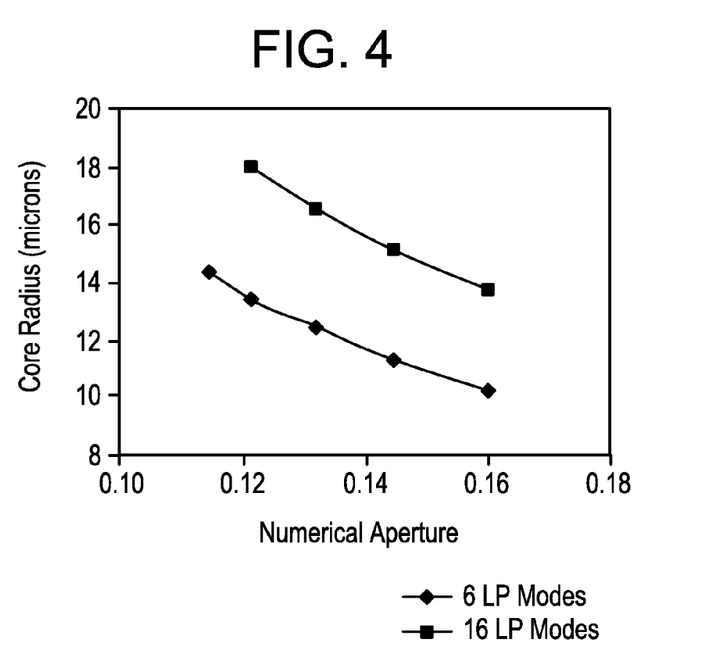
FIG. 4 illustrates the relationship between the NA and the core radius, for the embodiments of the fibers analyzed in FIG. 3.

FIG. 2 illustrates a schematic representation of the refractive index profile of the cross section of the glass region of a few moded optical fiber 10, according another embodiment. The few moded optical fiber 10 includes a glass core 20 and a glass cladding 60 that surrounds the core 20 and is in contact with the core 20. According to one embodiment the core 20 may include silica doped with germania. According to other embodiments, dopants other than germania, such as $Al_2O_3$ or $P_2O_5$ singly or in combination, may be employed within the core 20, and particularly at or near the centerline of the optical fiber 10. The cladding 60 of the optical fiber shown in FIG. 2 includes a depressed-index annular region 40, and an outer annular region 50, but does not include an inner annular region 30. The inner annular region 30 surrounds and is in contact with the core 20. In this embodiment, the depressed-index annular region 40 surrounds and is in contact with core 20. The outer annular region 50 surrounds and is in contact with the depressed-index annular region 40. The cladding 60 may further include additional regions (not shown) such as further glass regions surrounding the outer annular region 50. The fiber 10 may further include a protective coating 70 (not shown) surrounding the cladding 60.

Referring to both FIGS. 1 and 2, the few moded optical fiber 10 is shown with the core 20 having an outer radius $R_1$. According to one embodiment, the core outer radius $R_1$ is in the range of 7.5 to 18 microns, which corresponds to a core diameter in the range of 15 microns to 36 microns. Thus, the few moded optical fiber 10 employs a small diameter core 20 (<40 microns), which can result in an overall small diameter fiber 10. According to the fiber embodiments shown in FIGS. 1 and 2, the glass core 20 has a graded index having an alpha (α) value between 2.05≤α≤2.15 (e.g., between 2.1 and 2.12). As discussed above, according to some embodiments, the glass core 20 further has a maximum relative refractive index delta $\Delta_{1MAX}$ in the range of between 0.3 percent to 0.61 percent, and in some embodiments between 0.3 percent to 0.60 percent. According to some embodiments, the core 20 has a maximum relative refractive index $\Delta_{1MAX}$ less than 0.6 percent and the core radius $R_1$ in 7.5 to 36 microns (μm) range. According to some embodiments, the core 20 has a maximum relative refractive index delta $\Delta_{1MAX}$ not greater than 0.55 percent and the core radius $R_1$ is in 7.5 to 36 micron range.

In the embodiments with the inner cladding region 30, the inner cladding region 30 of cladding 60 has an outer radius $R_2$, a width $W_2$, relative refractive index $\Delta_2$, and a maximum relative refractive index delta $\Delta_{2MAX}$. $R_2$ is defined as the radius at which the derivative of the normalized refractive index profile with respect to the normalized radius, $d(\Delta/\Delta_{1MAX})/d(r/R_1)$, has a local minimum. The width $W_2$ of the inner cladding region 30 may be in the range of 0.5 to 4.0 microns, according to one embodiment. The outer radius $R_2$ of the inner cladding region 30 is generally in the range between 8 microns and 22 microns (e.g., 12 microns, 13 microns, 14 microns, 15 microns, 16 microns, 19 microns, 20 microns, 22 microns, or therebetween). In some embodiments, the maximum relative refractive index delta $\Delta_{2MAX}$ of the inner cladding is less than about 0.1%. In other embodiments, the maximum relative refractive index delta $\Delta_{2MAX}$ of the inner cladding is less than about 0.0%. In other embodiments, the maximum relative refractive index delta $\Delta_{2MAX}$ of the inner cladding is between about −0.2% and about 0.0%. In the embodiments with no inner cladding region 30, we define $R_2=R_1$. In some embodiment (as shown in FIG. 2), the alpha profile extends to $\Delta_{3min}$ (i.e., into the moat) at the radial location $R_2'$.

The depressed-index annular region 40 of cladding 60 has a minimum relative refractive index $\Delta_{3MIN}$ and extends from $R_2$ to $R_3$, wherein $R_3$ is the radius at which $\Delta_3(r)$ first reaches a value of greater than −0.05%, going radially outwardly from the radius at which $\Delta_3(r)=\Delta_{3MIN}$. The depressed-index annular region 40 has a radial width $W_3=R_3-R_2$, or in the embodiments without the inner annular region 30 $W_3=R_3-R_1$. In one embodiment, the depressed-index annular region 40 has a width $W_3$ of at least 1 micron. $W_3$ is preferably between 2 microns and 10 microns, more preferably between 2 microns and 8 microns and even more preferably between 2 microns and 6 microns. The depressed-index annular region 40 may have an outer radius $R_3$, for example, in the range of 12 to 23 microns or 14 to 30 microns. The depressed-index annular region 40 has a minimum relative refractive index $\Delta_{3MIN}$ of less than about −0.2 percent, and more preferably refractive index $\Delta_{3MIN}$ may be, for example, in the range of −0.2 to −0.5 percent.

The outer annular region 50 of cladding 60 has an outer radius $R_4$ and has relative refractive index $\Delta_4$ which is greater than $\Delta_{3MIN}$ and preferably less than $\Delta_{1MAX}$. Accordingly, $\Delta_{1MAX}>\Delta_4>\Delta_{3MIN}$ in this embodiment. For example, $\Delta_4$ may be equal to $\Delta_{2MAX}$. According to some exemplary embodiment, the outer radius $R_4$ is 62.5 microns (i.e., in these embodiments the cladding's outer diameter $D_4$ is 125 microns). In some embodiments the outer radius $R_4$ is 40 microns ≤$R_4$≤75 microns and 80 microns ≤$D_4$≤150 microns. The smaller core diameter $D_1$ of the few moded fibers 10 enables the cladding radius $R_4$ to be smaller than 62.5 microns without inducing large microbending losses, for example $R_4$=60 microns, $R_4$=50 microns or $R_4$=40 microns, or 60 microns≥$R_4$≥40 microns.

The fiber's bandwidth BW is a function of the core delta. More specifically, the maximum bandwidth BW increases as the maximum core delta $\Delta 1_{MAX}$ decreases. That is, for the bandwidths with a peak wavelength, $\lambda p$, situated in around 850 nm wavelength (i.e., within 840 nm to 860 preferably within 845 and 855 nm range, for example within 849 and 851 nm range), optical fibers 10 with lower $\Delta 1_{MAX}$ values tend to produce higher maximum bandwidths. However, we discovered that if the reduction in core delta $\Delta 1_{MAX}$ is not accompanied by a reduction in the core diameter $D_1$, the bend loss increases beyond an acceptable level. However, if the core diameter $D_1$ is too small, then it compromises the need for flexible and robust connectivity and alignment tolerances. Furthermore, for a given core diameter $D_1$, if the delta $\Delta 1_{MAX}$ is too small, then there is a risk of high macro- and micro-bending sensitivity since the outer modes are more weakly guided by the core. Finally, although the fiber bandwidth increases with decreasing core delta, the numerical aperture decreases and this might also negatively impact connectivity.

However, we have discovered that that it is possible to design a few mode (i.e., as described herein a fiber that supports propagation of no more than 8 mode groups, (for example 7 mode groups)) fiber 10 that yield high bandwidth while preserving robust connectivity and bend performance.

According to some embodiments, fiber 10 preferably has an overfilled bandwidth greater than 4 GHz-km at 850 nm (e.g., >10 GHz-km, or >20 GHz-km), and a numerical aperture NA between 0.10 and 0.17 and preferably between 0.11 and 0.165, (e.g., 0.12 to 0.16) and microbending sensitivity $\gamma$ such that $1.5 \geq \gamma$, for example $1.2 \geq \gamma$, or even $1 \geq \gamma$, Preferably, the core delta and radius of the few-moded fiber 10 are structured so that the cutoff wavelengths of modes in the eighth ($8^{th}$) mode group are less than 855 nm (more preferably less than 850 nm), and the fiber guides fewer than seven mode groups at a wavelength of 855 nm or greater. The few-moded fiber 10 is then capable of supporting six or fewer mode groups at a wavelength of 850 nm when they are optically excited by a source such as a VCSEL. In some embodiments the fiber core is structured so that it guides six or fewer mode groups at a wavelength of 855 nm or greater (but at least 2 mode groups). In some embodiments the fiber guides fewer than six mode groups (but more than 2) at a wavelength of 850 nm or greater. Preferably, the core delta and radius of the few-moded fiber are structured so that the cutoff wavelength of the sixteenth ($16^{th}$) mode is less than 855 nm (more preferably less than 850 nm). The few-moded fiber 10 is then capable of supporting 15 modes at a wavelength of 850 nm when they are optically excited by a source such as a VCSEL. The reduction in the number of mode groups that can propagate through the fiber 10 increases the maximum possible bandwidth (BW). The smaller core diameter in these designs results in a reduction in the number of propagating modes, and this increases the maximum bandwidth of the fiber 10.

The refractive index profile of a radially symmetric optical fiber depends on the radial coordinate r and is independent of the azimuthal coordinate $\phi$. In most optical fibers, including the examples disclosed below, the refractive index profile exhibits only a small index contrast, and the fiber can be assumed to be only weakly guiding. If both of these conditions are satisfied, Maxwell's equations can be reduced to the scalar wave equation, the solutions of which are linearly polarized (LP) modes.

For a given wavelength, the radial equation of the scalar wave equation for a given refractive index profile has solutions which tend to zero for r going to infinity only for certain discrete values of the propagation constant $\beta$. These eigen vectors (transverse electric field) of the scalar wave equation are guided modes of the fiber, and the eigen values are the propagation constants $\beta_{lm}$, where l is the azimuthal index and m is the radial index. In a graded index fiber, the LP modes can be divided into groups, designated by common values of the principle mode number, p=l+2m−1. The modes in these groups have nearly degenerate propagation constants and cutoff wavelengths and tend to propagate through the fiber with the same group velocity. For example, the modes in the seventh mode group (mode group 7) are designated (LP61, LP42, LP23 and LP04), the modes in mode group 6 are designated (LP51, LP32 and LP13), the modes in mode group 5 are designated (LP41, LP22 and LP03), the modes in mode group 4 are designated LP31 and LP12, the modes in mode group 3 are designated LP21 and LP02, the modes in the mode group 2 are designated LP11, and the modes in mode group 1 are designated LP01.

The cutoff wavelength of a particular mode group is the minimum wavelength beyond which all modes from that mode group cease to propagate in the optical fiber. The cutoff wavelength of a single mode fiber is the minimum wavelength at which an optical fiber will support only one propagating mode. The cutoff wavelength of a single mode fiber corresponds to the highest cutoff wavelength among the higher order modes. Typically the highest cutoff wavelength corresponds to the cutoff wavelength of the LP11 mode. If the operative wavelength is below the cutoff wavelength, few moded operation may take place and the introduction of additional sources of dispersion may limit a fiber's information carrying capacity. A mathematical definition can be found in Single Mode Fiber Optics, Jeunhomme, pp. 39 44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The requirements for a fiber propagating fewer than 7 mode groups is that the cutoff wavelengths of all of the modes in the $7^{th}$ mode group are less than the operating wavelength $\lambda$. The mode with the lowest l value generally has the highest cutoff wavelength in a graded index few moded fiber. If the operating wavelength is 850 nm, and the fiber is designed to propagate 3 mode groups, it is sufficient to require that the cutoff wavelength of the modes (LP03, LP22 and LP41) is less than 850 nm. The exemplary optical fiber embodiments described below support the propagation of 2 to 7 mode groups at 850 nm when the modes are optically excited by a suitable source such as a VCSEL.

Various embodiments will be further clarified by the following examples. Set forth below in Tables 1-6 are a variety of modeled examples in accordance with the embodiments of the present invention. Examples 1-21 exhibit refractive index profiles similar to those illustrated by FIG. 1, and Examples 22-26 exhibit refractive index profiles similar to those illustrated by FIG. 2. In particular, provided below are $\Delta 1_{MAX}$ of core region 20 (also referred to as a core region 20 herein), outer radius $R_1$ of core region 20, alpha ($\alpha$) of core region 20, $\Delta 3_{MIN}$ of depressed index cladding region 40, outer radius $R_3$ of depressed index cladding region 40, clad radius $R_4$ is the outermost radius of the uncoated fiber as well as the outer radius of the outer annular glass cladding region 60. Also provided is numerical aperture NA of the fiber. More specifically, optical fibers of Tables 1-5 are similar to the fibers of FIG. 1, and their cladding includes an inner cladding region 30 (also referred to as an inner cladding region 30 herein). The inner cladding region 30 of these exemplary fibers has a relative refractive index delta $\Delta_2$ and an outer radius $R_2$. The optical fibers of Table 6 are similar to the fibers of FIG. 2, and the cladding of these fiber embodiments does not include an inner cladding region 30. The depressed index cladding region 40 of these exemplary fibers also has a relative refractive index delta $\Delta_3$ and an outer radius $R_3$. In each case, conventional primary and secondary urethane acrylate based protective coatings are applied to the outside of the glass optical fibers 10. In these exemplary embodiments the outer cladding diameter $D_4$ of the optical fibers 10 is 125 microns. The absolute magnitude of $V_3$ in these examples is greater than 35%-micron$^2$, and between 35%-micron$^2$ and 105%-micron. These examples have glass graded index core having alpha profile such that $2.0 \leq \alpha \leq 2.15$, a diameter $D_1$, such that 12.5 microns $\leq D_1 < 40$ microns, a maximum relative refractive index between 0.265 and 0.65 percent, Also shown in these examples, the fiber core has a numerical aperture NA, wherein $0.11 \leq NA \leq 0.17$. The cladding includes a depressed-index annular region where the depressed-index annular region has a relative refractive index delta of less than $-0.15\%$.

Various embodiments will be further clarified by the following examples.

Example 1

Embodiments that support the propagation of 7 mode groups (fiber examples 1-4).

TABLE 1

| Parameter | Ex1 | Ex2 | Ex3 | Ex4 |
|---|---|---|---|---|
| $\Delta_{1MAX}$ (%) | 0.350 | 0.413 | 0.499 | 0.609 |
| $R_1$ (microns) | 18.04 | 16.60 | 15.05 | 13.73 |
| Alpha | 2.107 | 2.106 | 2.105 | 2.104 |
| $\Delta_2$ (%) | 0 | 0 | 0 | 0 |
| $R_2$ (microns) | 20.10 | 18.41 | 16.60 | 15.03 |
| $\Delta_3$ (%) | −0.43 | −0.43 | −0.43 | −0.43 |
| $R_3$ (microns) | 24.1 | 22.31 | 20.61 | 19.1 |
| $V_3$ (%-sq. microns) | 76.0 | 68.3 | 64.1 | 59.7 |
| Modes Groups | 7 | 7 | 7 | 7 |
| OFL BW (GHz-km) | 55.1 | 44.6 | 37.9 | 31.3 |
| DGD (ps/km) | 11.9 | 14.0 | 16.7 | 21.0 |
| Dispersion 850 nm (ps/nm/km) | −88.1 | −88.9 | −90.0 | −91.4 |
| Attenuation 850 nm (dB/km) | 1.816 | 1.817 | 1.819 | 1.821 |
| Microbend Sensitivity | 6.29 | 2.75 | 1.05 | 0.40 |
| Numerical Aperture | 0.12 | 0.13 | 0.15 | 0.16 |

Example 2

Fiber Examples 5-8

TABLE 2

Embodiments that support the propagation of 6 mode groups.

| Parameter | Ex5 | Ex6 | Ex7 | Ex8 |
|---|---|---|---|---|
| $\Delta_{1MAX}$ (%) | 0.615 | 0.504 | 0.409 | 0.349 |
| $R_1$ (microns) | 11.85 | 13.17 | 14.67 | 15.75 |
| Alpha | 2.105 | 2.106 | 2.106 | 2.106 |
| $\Delta_2$ (%) | 0 | 0 | 0 | 0 |
| $R_2$ (microns) | 13.01 | 14.56 | 16.33 | 17.65 |
| $\Delta_3$ (%) | −0.4 | −0.4 | −0.4 | −0.4 |
| $R_3$ (microns) | 17.5 | 19 | 20.9 | 22.3 |
| $V_3$ (%-sq. microns) | 54.8 | 59.6 | 68.0 | 74.3 |
| Mode Groups | 6 | 6 | 6 | 6 |
| OFL BW (GHz-km) | 32.6 | 47.8 | 52.7 | 54.7 |
| DGD (ps/km) | 19.4 | 14.2 | 11.4 | 10.2 |
| Dispersion 850 nm (ps/nm/km) | −91.8 | −90.0 | −88.8 | −88.1 |
| Attenuation 850 nm (dB/km) | 1.823 | 1.820 | 1.818 | 1.817 |
| Microbend Sensitivity | 0.22 | 0.60 | 1.73 | 3.71 |
| Numerical Aperture | 0.16 | 0.15 | 0.13 | 0.12 |

Example 3

Fiber Examples 9-13

TABLE 3

Embodiments that support the propagation of 5 mode groups.

| Parameter | Ex9 | Ex10 | Ex11 | Ex12 | Ex13 |
|---|---|---|---|---|---|
| $\Delta_{1MAX}$ (%) | 0.602 | 0.493 | 0.411 | 0.349 | 0.310 |
| $R_1$ (microns) | 10.29 | 11.34 | 12.48 | 13.44 | 14.36 |
| Alpha | 2.106 | 2.106 | 2.107 | 2.108 | 2.108 |
| $\Delta_2$ (%) | 0 | 0 | 0 | 0 | 0 |
| $R_2$ (microns) | 11.44 | 12.64 | 14.00 | 15.28 | 16.28 |
| $\Delta_3$ (%) | −0.47 | −0.41 | −0.4 | −0.47 | −0.4 |
| $R_3$ (microns) | 16 | 16.5 | 18.8 | 19.3 | 20 |
| $V_3$ (%-sq. microns) | 58.8 | 46.1 | 63.0 | 65.3 | 53.9 |
| Mode Groups | 5 | 5 | 5 | 5 | 5 |
| OFL BW (GHz-km) | 39.1 | 45.6 | 55.1 | 56.8 | 72.1 |
| DGD (ps/km) | 13.5 | 12.3 | 11.1 | 9.0 | 6.7 |
| Dispersion 850 nm (ps/nm/km) | −90.6 | −89.8 | −88.8 | −88.1 | −87.6 |
| Attenuation 850 nm (dB/km) | 1.825 | 1.822 | 1.820 | 1.819 | 1.818 |
| Microbend Sensitivity | 0.13 | 0.35 | 0.89 | 1.97 | 3.63 |
| Numerical Aperture | 0.16 | 0.14 | 0.13 | 0.12 | 0.11 |

Example 4

Fiber Examples 14-18

TABLE 4

Embodiments that support the propagation of 4 mode groups.

| Parameter | Ex14 | Ex15 | Ex16 | Ex17 | Ex18 |
|---|---|---|---|---|---|
| $\Delta_{1MAX}$ (%) | 0.463 | 0.403 | 0.350 | 0.301 | 0.268 |
| $R_1$ (microns) | 9.81 | 10.43 | 11.30 | 12.06 | 12.88 |
| Alpha | 2.106 | 2.108 | 2.107 | 2.108 | 2.108 |
| $\Delta_2$ (%) | 0 | 0 | 0 | 0 | 0 |
| $R_2$ (microns) | 11.04 | 11.83 | 12.87 | 13.76 | 14.75 |
| $\Delta_3$ (%) | −0.4 | −0.4 | −0.4 | −0.35 | −0.35 |
| $R_3$ (microns) | 15 | 15.4 | 17 | 17.2 | 18.5 |
| $V_3$ (%-sq. microns) | 41.3 | 38.9 | 49.3 | 37.3 | 43.6 |
| Mode Groups | 4 | 4 | 4 | 4 | 4 |
| OFL BW (GHz-km) | 77.3 | 99.2 | 90.0 | 92.3 | 108.6 |
| DGD (ps/km) | 8.2 | 5.8 | 6.2 | 6.1 | 5.5 |
| Dispersion 850 nm (ps/nm/km) | −89.4 | −88.7 | −88.0 | −87.4 | −87.1 |
| Attenuation 850 nm (dB/km) | 1.823 | 1.822 | 1.820 | 1.819 | 1.818 |
| Microbend Sensitivity | 0.24 | 0.46 | 0.97 | 1.99 | 3.64 |

Example 5

Fiber Examples 19-21

TABLE 5

Embodiments support the propagation of 3 mode groups.

| Parameter | Ex19 | Ex20 | Ex21 |
|---|---|---|---|
| $\Delta_{1MAX}$ (%) | 0.460 | 0.410 | 0.362 |
| $R_1$ (microns) | 7.87 | 8.31 | 8.86 |
| Alpha | 2.106 | 2.108 | 2.108 |
| $\Delta_2$ (%) | 0 | 0 | 0 |
| $R_2$ (microns) | 8.92 | 9.36 | 10.10 |
| $\Delta_3$ (%) | −0.4 | −0.32 | −0.34 |
| $R_3$ (microns) | 12.5 | 13.5 | 14 |
| $V_3$ (%-sq. microns) | 30.6 | 30.3 | 31.9 |
| Mode Groups | 4 | 4 | 4 |
| OFL BW (GHz-km) | 80.6 | 161.8 | 147.8 |
| DGD (ps/km) | 5.7 | 2.5 | 3.1 |
| Dispersion 850 nm (ps/nm/km) | −89.3 | −88.7 | −88.1 |
| Attenuation 850 nm (dB/km) | 1.827 | 1.825 | 1.823 |
| Microbend Sensitivity | 0.10 | 0.18 | 0.33 |
| Numerical Aperture | 0.14 | 0.13 | 0.12 |

Example 6

Fiber Examples 22-26

TABLE 6

Table 6. Exemplary embodiments similar to those shown in FIG. 2, that propagate 3-6 mode groups.

| Parameter | Ex22 | Ex23 | Ex24 | Ex25 | Ex26 |
|---|---|---|---|---|---|
| $\Delta_{1MAX}$ (%) | 0.43 | 0.49 | 0.51 | 0.44 | 0.39 |
| $R_1$ (microns) | 9.23 | 9.71 | 13.18 | 12.21 | 13.03 |
| Alpha | 2.101 | 2.100 | 2.100 | 2.100 | 2.100 |
| $\Delta_2$ (%) | −0.41 | −0.44 | −0.35 | −0.41 | −0.41 |
| $R_2'$ (microns) | 12.70 | 13.20 | 16.90 | 16.70 | 18.40 |
| $\Delta_3$ (%) | −0.41 | −0.44 | −0.35 | −0.41 | −0.41 |
| $R_3$ (microns) | 17.00 | 17.00 | 21.00 | 20.50 | 22.50 |
| $V_3$ (%-sq. microns) | 68.3 | 68.4 | 73.3 | 84.9 | 103.8 |
| Mode Groups | 3 | 4 | 6 | 5 | 5 |
| OFL BW (GHz-km) | 207.6 | 96.1 | 68.7 | 96.2 | 130.4 |
| DGD (ps/km) | 1.9 | 5.3 | 8.9 | 5.9 | 4.2 |
| Dispersion 850 nm (ps/nm/km) | −88.6 | −89.3 | −89.8 | −88.9 | −88.3 |
| Attenuation 850 nm (dB/km) | 1.82 | 1.82 | 1.82 | 1.82 | 1.82 |
| Microbend Sensitivity | 0.23 | 0.20 | 0.58 | 0.67 | 1.29 |
| Numerical Aperture | 0.14 | 0.14 | 0.15 | 0.14 | 0.13 |

Figure 5:
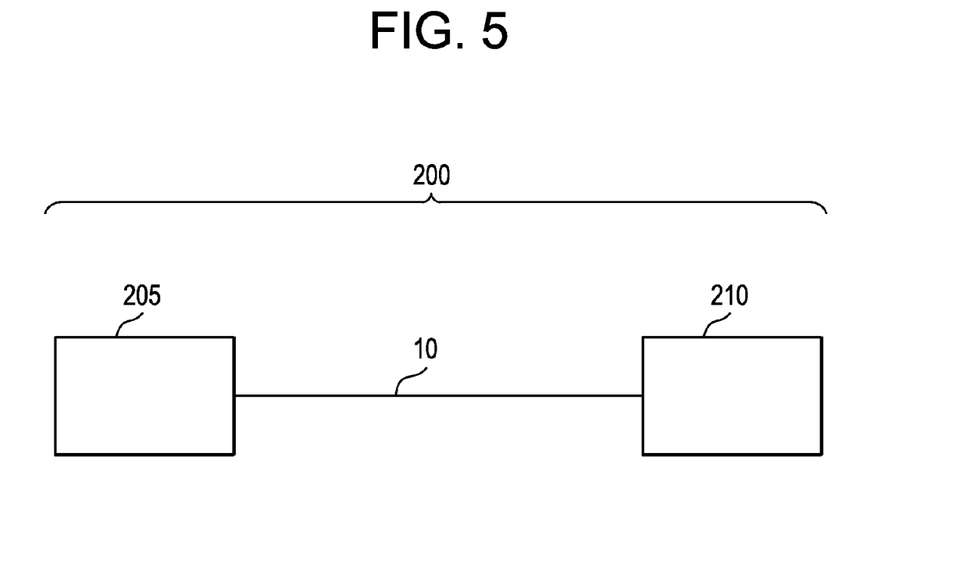
FIG. 5 is a schematic diagram illustrating a system employing the few moded optical fiber, according to one embodiment.

The few moded fibers 10 of Tables 1 through 6 are suitable for use in an optical transmission system. According to one embodiment, the system 200 comprises: (i) at least one light source (e.g., VCSEL 205), wherein the light source (e.g., VCSEL 205) transmits at a bit rate of at least 10 Gb/s, preferably 25 Gb/s or higher at one or more wavelengths between 840 and 860 nm (e.g., 850 nm); (ii) at least one few moded optical fiber 10; and (iii) a detector 210. The detector 210 is optically coupled to the few moded optical fiber 10 and capable of detecting a wavelength in 840 nm to 860 nm range. The optical fiber 10 comprises graded index glass core 20, an optional inner cladding region 30 surrounding the core, a depressed index region 40, and an outer cladding, and has an overfilled bandwidth at an operating wavelength situated in the 840 nm to 860 nm wavelength range greater than 4 GHz-km; $2.05 \leq \alpha \leq 2.15$ (e.g., an alpha greater than 2.05 and less than 2.13, or an alpha greater than 2.09 and less than 2.12); and an attenuation less than 2.5 dB/km (and in some embodiments less than 2 dB/km) at the operating wavelength. In some embodiments, for example, the light source (e.g., VCSEL 205, or a laser, etc.) may transmit transmits at a bit rate of at least 10 Gb/s, in some embodiments at least 25 Gb/s, in some embodiments 40 Gb/s. Some embodiments of fiber have an overfilled bandwidth greater than 10 GHz-km at one or more wavelengths between 845 nm and 855 nm, and some embodiments of fiber have an overfilled bandwidth greater than 20 GHz-km at all wavelengths between 840 nm and 860 nm.

The fiber 10, for example, comprises a graded index glass core; an inner cladding surrounding and in contact with the core, a depressed-index annular region surrounding the inner cladding, the depressed-index annular region having a refractive index delta less than about −0.2% and a width of at least 1 micron, wherein the core has a radius greater than 6.5 microns and less than 20 microns (and in some embodiments 7.5 to 19 microns, for example 8 microns, 9 microns, 10 microns, 11 microns, 12 microns, 13 microns, 14 microns, 15 microns, 16 microns), a maximum refractive index delta between 0.265% and 0.65%, and an alpha $2 \leq \alpha \leq 2.15$, for example $2.05 \leq \alpha \leq 2.15$, or $2.05 \leq \alpha \leq 2.12$, or $2.1 \leq \alpha \leq 2.11$; and wherein the fiber has relative microbending sensitivity $\gamma$ such that $\gamma \leq 1.5$. The fiber 10 has, at one or more wavelengths between 840 nm and 860 nm, and attenuation less than 2.5 dB/km and preferably less than 2 dB/km.

Thus, a few moded optical fiber 10 comprises:

(a) a glass graded index core 20 having alpha profile such that $2.0 \leq \alpha \leq 2.15$, a diameter $D_1$, such that 12.5 microns $\leq D_1 < 40$ microns, a maximum relative refractive index between 0.265 and 0.65 percent, said core, the glass core diameter $D_1$ and refractive index are selected such that the core is capable of supporting the propagation and transmission of an optical signal with X number of LP modes at a wavelength of 850 nm, wherein X is an integer greater than 1 and less than 20; and (b) a cladding 60 comprising a depressed-index annular region 40 surrounding the core 20, the depressed-index annular region 40 having a relative refractive index delta of less than −0.1% and a width of at least 1 micron, wherein the optical fiber 10 has an overfilled bandwidth greater than 2.5 GHz-km at 850 nm. According to some embodiments the fiber 10 has relative microbending sensitivity $\gamma$ such that $\gamma \leq 1.5$, or even $\gamma \leq 1$.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A few moded optical fiber comprising:
a glass graded index core having alpha profile such that $2.0 \leq \alpha \leq 2.15$, a diameter $D_1$, such that 12.5 microns $\leq D_1 < 40$ microns, a maximum relative refractive index between 0.265 and 0.65 percent, the glass core diameter $D_1$ and refractive index are selected such that the core is capable of supporting the propagation and transmission of an optical signal with X number of mode groups at a wavelength of 850 nm, wherein X is an integer greater than 1 and less than 8; and a cladding comprising a depressed-index annular region surrounding the core, said depressed-index annular region having a relative refractive index delta of less than −0.1% and a width of at least 1 micron, wherein the fiber has an overfilled bandwidth greater than 2.5 GHz-km at 850 nm and relative microbending sensitivity γ such that γ≤1.5.

2. The few moded optical fiber according to claim 1, wherein said depressed-index annular region having a relative refractive index of less than −0.2% and said cladding further comprises an inner cladding regioin surrounding and in contact with the core, wherein cladding further comprises an inner cladding and the width of said inner cladding is at least 0.5 microns and less than 4 microns and said depressed-index annular region surrounds the inner cladding.

3. The few moded optical fiber according to claim 1, wherein said relative maximum refractive index of said core is less than 0.6 percent.

4. The few moded fiber of claim 1, wherein said fiber exhibits an overfilled bandwidth at a wavelength situated in 840 nm to 860 nm range which is greater than 4 GHz-km.

5. The few moded fiber of claim 1, wherein said fiber exhibits an overfilled bandwidth at a wavelength situated in 840 nm to 860 nm range which is greater than 10 GHz-km.

6. The few moded fiber of claim 1, wherein said fiber exhibits an overfilled bandwidth at a wavelength situated in 840 nm to 860 nm wavelength range which is greater than 20 GHz-km.

7. The few moded fiber of claim 1, wherein said fiber exhibits an overfilled bandwidth at a wavelength situated in 840 nm to 860 nm range which is greater than 50 GHz-km.

8. The few moded fiber of claim 1, wherein said core comprises a diameter $D_1$ between 16 and 36 microns.

9. The few moded fiber of claim 1, wherein said core comprises diameter $D_1$ between 12.5 and 25 microns.

* * * * *